United States Patent Office

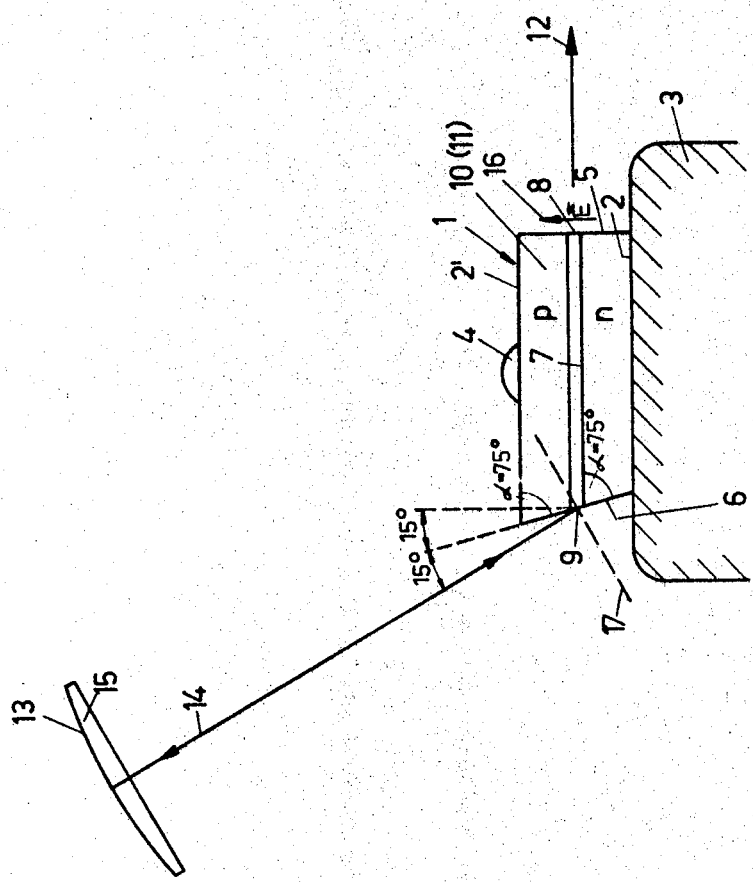

3,524,146
Patented Aug. 11, 1970

3,524,146
SEMICONDUCTOR LASER HAVING A BREWSTER ANGLE FACE AND A REMOTE REFLECTOR
Eugen Mohn, Bern, Switzerland, assignor to Institut fur angewandte Physik der Universitat Bern, Bern, Switzerland
Filed Mar. 25, 1968, Ser. No. 715,687
Claims priority, application Switzerland, May 11, 1967, 6,667/67
Int. Cl. H01s 3/00
U.S. Cl. 331—94.5     6 Claims

ABSTRACT OF THE DISCLOSURE

A laser oscillator provided with a laser diode wherein light rays are reflected back and forth and amplified in a pn-transition zone and at least one of the oscillator reflectors is at a distance from the laser diode. Reflection losses at the lateral surface of the diode facing the distant reflector are averted by inclining that surface at the Brewster angle relative to the direction of the light rays passing through the pn-transition zone.

---

In laser oscillators with laser diodes, two opposite, parallel lateral surfaces of a small crystal block constituting the diode generally are used as reflectors to reflect the light rays back and forth which are generated by the action of an electric potential in the pn-transition zone of the diode. The rays undergo amplification at each pass through that zone.

This very simple arrangement has the disadvantage that no other elements can be installed between the two reflectors. Such additional elements may be desirable, e.g., for purposes of modulation. In order to overcome this drawback, a laser oscillator has been devised which has a laser diode provided with a pn-transition layer which is disposed between two reflectors between which the light rays, passing through the pn-transition layer, are reflected back and forth and amplified. At least one of these reflectors is at a distance from the laser diode and reflection losses on the lateral surface of the diode facing the reflector are averted.

The production of such an oscillator is extremely difficult because it practically is impossible, even with utmost care, to manufacture a reflection-reducing layer of the exact thickness required for elimination of the reflection losses.

It is the object of the invention to provide a device free of the disadvantages named. This is accomplished by averting the reflection losses in the following manner:

The lateral surface of the laser diode facing the reflector at a distance is inclined at the Brewster angle relative to the direction of the rays passing through the pn-transition layer.

The invention will be more fully explained with reference to the accompanying drawing. However, it should be understood that this is given merely by way of illustration, and not of limitation, and that it is intended to cover all modifications and variations which do not constitute a departure from the spirit and the scope of the invention as hereinafter claimed.

The sole figure in the drawing is a schematic of a laser oscillator with laser diode.

Referring now to this drawing, the laser oscillator has as amplifying element a laser diode 1 which, by way of example, may be a gallium arsenide crystal doped with zinc in the p-zone and with tellurium in the n-zone. Crystal 1 has two parallel rectangular principal surfaces 2 and 2', respectively. Surface 2 is fastened to an electroconductive support 3, and surface 2' is provided with an electrode 4. Lateral surface 5 is in vertical position relative to surfaces 2 and 2', while the opposite lateral surface 6 is inclined at an angle α which equals the Brewster angle for the boundary layer crystal-air. The pn-transition zone (or layer) 7 is in parallel to the principal surfaces 2 and 2', and its edges 8 and 9, disposed in lateral surfaces 5 and 6, respectively, are parallel to each other. The two other lateral surfaces 10 and 11 if crystal 1 are parallel to the drawing plane; however, their exact position is immaterial.

One of the two reflectors between which the amplifier element 1 of the laser oscillator must be positioned is formed by the lateral surface 5 of element 1 itself. Surface 5 is reflective in such a manner that a light ray passing through transition zone 7 falling on this surface 5 vertically, is reflected to a great extent. Reflector 5 also permits the emergence of a usable ray 12 from the oscillator. The other reflector of the laser oscillator is a concave mirror 13, disposed at distance of e.g., 17 mm. from amplifier element 1. Mirror or reflector 13 is struck at its center by light ray 14 emerging from edge 9 of transition zone 7. Mirror 13 may be produced, for instance, by vaporizing a gold layer on the convex side of a planoconvex, cylindrical, spherical or ellipsoidal lens 15.

When support 3 and electrode 4 are connected to a (e.g. pulsated) power source, a light ray is generated and amplified in transition zone 7. The electric field intensity E of the light ray is linearly polarized vertically to pn-transition layer 7, as shown by an arrow in the drawing. The thus polarized light ray passes, without any reflection losses, through lateral surface 6 which is inclined at the Brewster angle α and hence is refracted from the normal 17 toward surface 6. A Brewster angle of substantially 75° corresponds to the index of refraction of gallium arsenide. It should be pointed out that any suitable semiconductor elements containing any suiable impurities may be employed in lieu of gallium arsenide.

The ray is reflected practically 100% at mirror 13 and returns into pn-transition layer 7 through lateral surface 6 without reflection loss. It then again is reflected at reflector 5, and the passing repeated. At each passage through transition zone 7, an amplification of the light occurs.

The light exit edges 8 and 9 emit the light the more uniformly, the better the quality of crystal 1. This quality depends on uniform structure and uniform doping. Irregularities in the crystal cause a concentration of the light exit on light spots, whereby a linear polarization, vertical to polarization direction 16, can occur, which, however, is undesirable.

Because the light exit edges 8 and 9 are parallel to each other, the optical path of the light rays in the pn-transition zone is equally long at all points.

If lateral surface 6 is inclined at the Brewster angle relative to the direction of the light rays passing through the transition zone 7, but is so disposed that its edges 8 and 9 are not in parallel, the optical path of the rays is not the same at all points. Therefore, the resonance frequency conditions of the laser oscillator along the cross section of the flat, ribbon-shaped bundle of rays reflected back and forth in the oscillator are not alike at all points of the cross section.

Lateral surface 5 can be a cleavage face of crystal 1 or a ground surface. Lateral surface 6 is ground. Because of the small size of the laser diode whose principal surfaces are on the order of approximately 1 mm.$^2$, it is opportune to grind a crystal block which later is subdivided into a plurality of laser diodes 1.

While grinding of such blocks at the Brewster angle is not a simple procedure, it nevertheless is much less difficult than the coating of a reflection-reducing compound to such a thickness which precludes all reflection losses.

It also is feasible to install both reflectors of the laser oscillator at a distance from the laser diode. In this intance, both lateral surfaces of the laser diode facing the reflectors are inclined at the Brewster angle relative to the direction of the rays passing through the pn-transition zone, preferably in parallel. The latter has the advantage that cleavage faces of the crystal can be used as lateral surfaces and the pn-transition layer is produced at the Brewster angle relative to these surfaces upon doping.

What is claimed is:

1. A laser oscillator comprising a laser diode as an amplifying element and a reflector at each side of said element; said diode having an n-zone, a p-zone and a pn-transition zone; applied current means generating light rays which pass through said pn-transition zone and are reflected back and forth through said zone and are amplified at each passage; at least one of said reflectors being at a predetermined distance from said diode; the lateral surface of said diode facing said distant reflector being inclined at the Brewster angle relative to the direction of the rays passing through said pn-transition zone; thereby averting reflection losses.

2. The oscillator as defined in claim 1, wherein the edges of said pn-transition zone, which permit exit of light, are in parallel at opposite lateral surfaces of said laser diode.

3. The laser oscillator as defined in claim 1, wherein said distant reflector is a concave mirror.

4. The laser oscillator as defined in claim 1, wherein one of said reflectors is at said distance, and the other reflector is one lateral surface of the diode, vertical to the pn-transition zone.

5. The laser diode as defined in claim 1, wherein the laser diode is a gallium arsenide crystal having as impurities zinc in the p-zone and tellurium in the n-zone; the Brewster angle for said crystal being substantially 75°.

6. The laser oscillator as defined in claim 1, wherein the distance of the reflector from the laser diode is approximately 17 mm.

References Cited

UNITED STATES PATENTS

| | | |
|---|---|---|
| 3,295,911 | 1/1967 | Ashkin et al. |
| 3,462,711 | 8/1969 | Nelson. |

RONALD L. WIBERT, Primary Examiner

E. BAUER, Assistant Examiner

U.S. Cl. X.R.

317—234